(12) United States Patent
Brace et al.

(10) Patent No.: US 7,682,256 B2
(45) Date of Patent: Mar. 23, 2010

(54) FLANGE DESIGN FOR FILAMENT WOUND COMPOSITE SHAFT

(75) Inventors: Michael Wayne Brace, Maysville, KY (US); Elias Tzioumis, Cincinnati, OH (US)

(73) Assignee: Kop-Flex Inc., Hanover, MD (US)

( * ) Notice: Subject to any disclaimer, the term of this patent is extended or adjusted under 35 U.S.C. 154(b) by 337 days.

(21) Appl. No.: 11/520,218

(22) Filed: Sep. 13, 2006

(65) Prior Publication Data
US 2008/0064511 A1 Mar. 13, 2008

(51) Int. Cl.
*F16D 1/068* (2006.01)
(52) U.S. Cl. .................... 464/181; 156/172
(58) Field of Classification Search ........ 464/179, 464/181–183; 156/172; 428/36, 36.1, 36.2, 428/36.3, 36.9
See application file for complete search history.

(56) References Cited

U.S. PATENT DOCUMENTS

| | | | |
|---|---|---|---|
| 4,118,262 A * | 10/1978 | Abbott | |
| 4,569,710 A * | 2/1986 | Lambot et al. | |
| 4,952,195 A | 8/1990 | Traylor | |
| 5,601,494 A | 2/1997 | Duggan | |
| 5,665,187 A | 9/1997 | Mackellar | |
| 5,683,300 A * | 11/1997 | Yasui et al. | 464/181 |
| 5,685,576 A | 11/1997 | Wolfe et al. | |
| 5,685,933 A * | 11/1997 | Ohta et al. | 464/181 |
| 6,350,204 B1 * | 2/2002 | Yasui et al. | 464/181 |
| 2003/0125117 A1 * | 7/2003 | Burkett | 464/181 |
| 2005/0159229 A1 * | 7/2005 | Lee et al. | 464/181 |

FOREIGN PATENT DOCUMENTS

| | | |
|---|---|---|
| DE | 3421191 | 12/1985 |
| EP | 0511843 | 4/1992 |
| GB | 2435317 | 8/2007 |
| WO | WO/89/12759 | 12/1989 |

OTHER PUBLICATIONS

Lin et al., "Development of a Braided Composite Drive Shaft With Captured End Fittings," American Helicopter Society 60th Annual Forum, Baltimore, MD, Jun. 7-10, 2004.

* cited by examiner

*Primary Examiner*—Greg Binda
(74) *Attorney, Agent, or Firm*—Harness, Dickey & Pierce, P.L.C.

(57) ABSTRACT

A composite shaft assembly may include a shaft body and a flange. The shaft body may include a filament and the flange may include an external surface having a plurality of lugs extending therefrom. A first and second of the plurality of lugs may have an axial spacing therebetween. The filament may be wound between the first and second lugs.

20 Claims, 3 Drawing Sheets

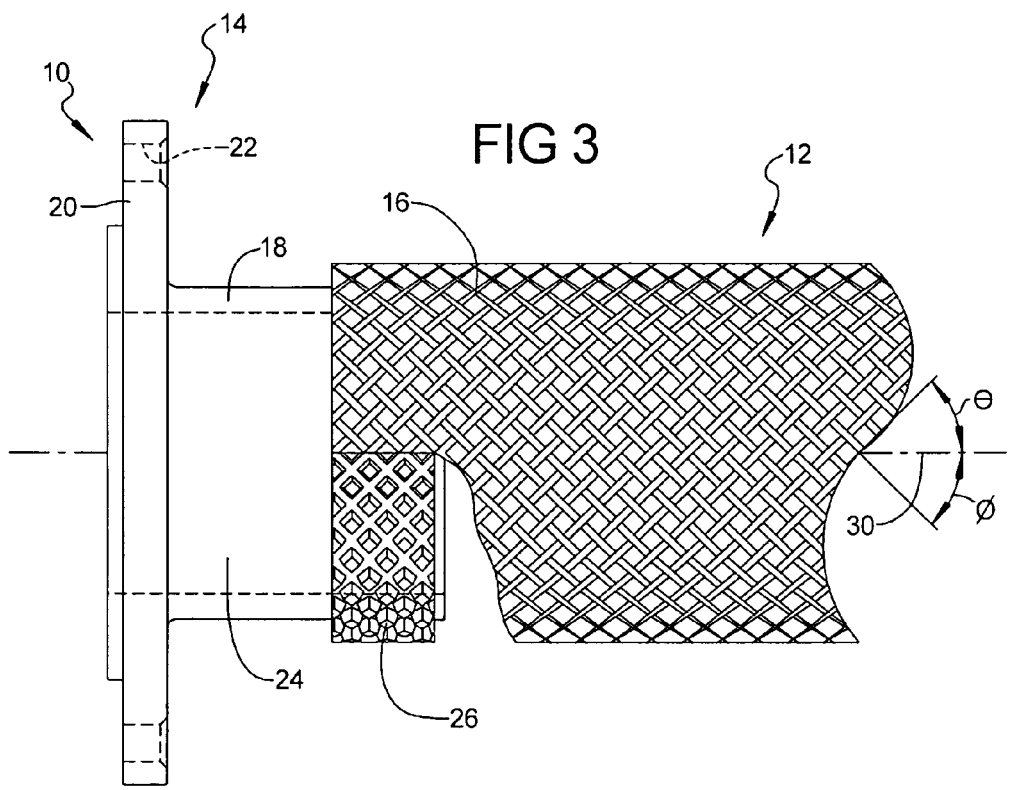
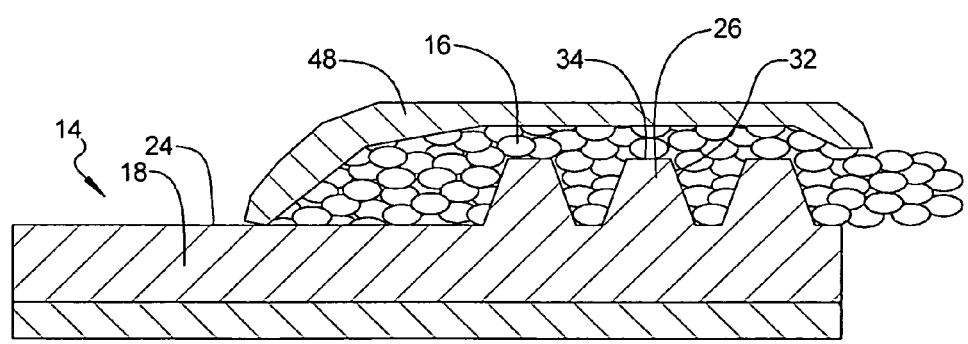

ing into channels 28, 28' of flange 14 may create a geometrically compliant joint between shaft 12 and flange 14 similar to a finger joint found in woodworking. It should also be noted that a flange according to the present disclosure may be formed from a variety of materials including both metallic and non-metallic materials such as aluminum, steel, and plastic.

FLANGE DESIGN FOR FILAMENT WOUND COMPOSITE SHAFT

FIELD

The present disclosure relates to composite shaft assemblies, whereas a composite shaft is defined as including but not limited to a tube made from one or more carrier fibers impregnated with one or more types of structural binders and that the composite tube is subject to an unspecified cure cycle in order for the composite tube to achieve mechanical properties and more specifically, to a flange having a composite shaft coupled thereto.

BACKGROUND AND SUMMARY

The statements in this section merely provide background information related to the present disclosure and may not constitute prior art.

There are several methods for attaching a flange to an end of a composite shaft. The barrel of a flange may be bonded onto an already-cured composite shaft. Holes may then be drilled radially through the bonded interface and pins or bolts may be placed therein for securing the flange to the shaft. However, these holes may result in damage to the fibers, reducing the overall strength of the composite shaft. Alternatively, an uncured composite shaft formed from filaments (comprised of a carrier and an uncured binder) may have these filaments wrapped around axially extending lugs on the barrel of a flange. However, since the filament is not wound along the axial channels created by these lugs, a pressure is required to force the filament into the channels between the axial lugs during curing of the filament.

According to the present disclosure, a composite shaft assembly may include a composite shaft body and a flange. The composite shaft body may include a composite filament and the flange may include an external surface having a plurality of lugs extending therefrom. A first and second of the plurality of lugs may have an axial spacing therebetween. The filament may be wound between the first and second lugs and cured in this wound state.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a fragmentary schematic side plan view of the composite shaft assembly of FIG. 1;

FIG. 4 is a fragmentary schematic section view of the composite shaft assembly of FIG. 1;

DETAILED DESCRIPTION

Figure 1:
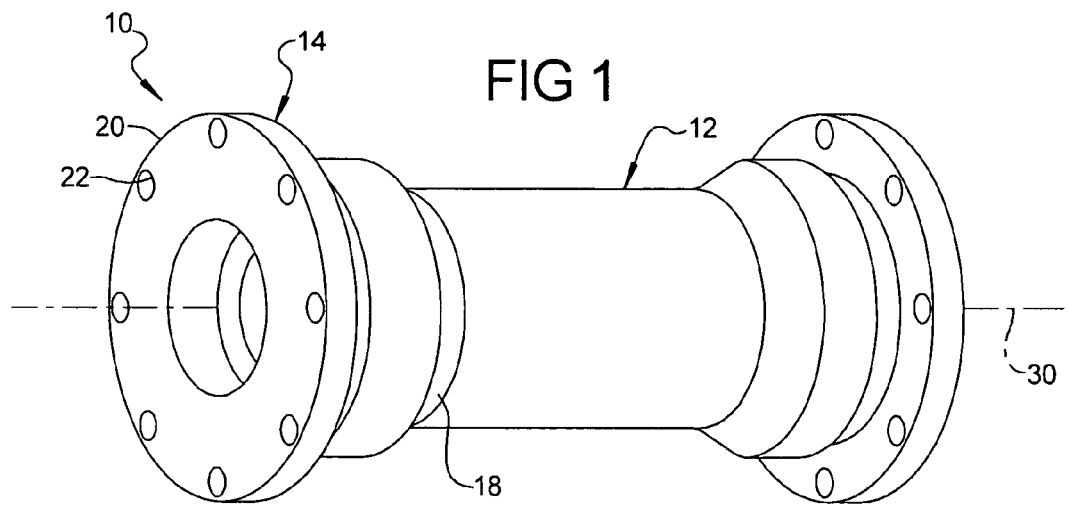
FIG. 1 is a perspective view of a composite shaft assembly according to the present disclosure.
Figure 2:
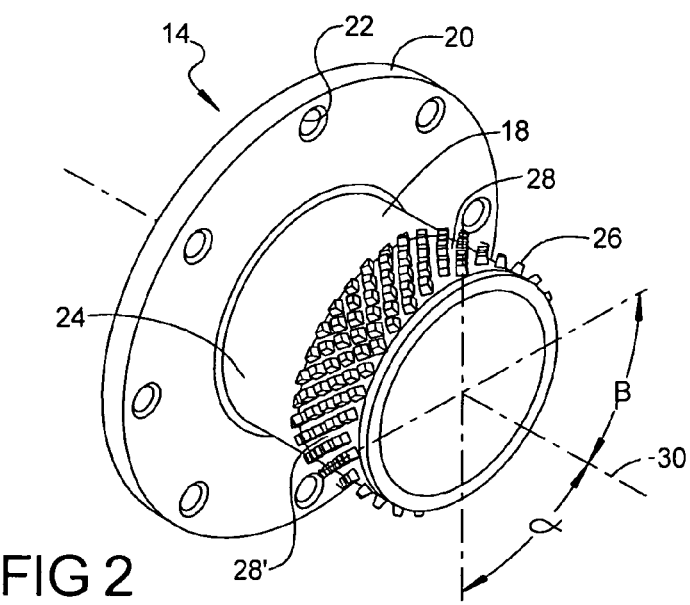
FIG. 2 is a perspective view of the flange of FIG. 1.

The following description is merely exemplary in nature and is not intended to limit the present disclosure, application, or uses.

As shown in FIGS. 1-4, a composite shaft assembly 10 may include a composite shaft 12 and a flange 14. Shaft 12 may include an uncured filament 16 (herein referred to as simply filament 16 and seen in FIGS. 3 and 4) which may be used for fixing composite shaft 12 to flange 14.

Flange 14 may include a generally hollow cylindrical body portion 18 having a radially outwardly extending flanged portion 20 extending from an end thereof. While flanged portion 20 is shown including a series of mounting apertures 22, it is understood that a variety of configurations may be used for mounting shaft assembly 10 to an additional structure.

Body portion 18 may include an external surface 24 having a plurality of lugs 26 extending therefrom, forming a coupling region. While shown located at an end of body portion 18, the coupling region may be located at any location along body portion 18. Lugs 26 may have an axial spacing therebetween. More specifically, lugs 26 may be disposed in rows forming channels 28 and 28' extending at angles α, β relative to the longitudinal axis 30 of flange 14 and shaft assembly 10. Channels 28, 28' may extend at angles generally opposite one another. For example, channel 28 may extend at angle α and channel 28' may extend at angle β generally opposite α. Angle α may be between 0 and 90 degrees and angle β may be between 0 and −90 degrees and may generally correspond to winding angles θ, φ of shaft filament 16. As such, channel 28 may be geometrically compliant and generally parallel to shaft filament 16. More specifically, angle α may be between 30 and 60 degrees and angle β may be between −30 and −60 degrees. While shown generally similar to one another, it is understood that angles α, β may be modified to achieve a desired torque transfer level.

Lugs 26 may extend a predetermined length above external surface 24. This length may be varied to achieve a desired torque transfer level as well. A variety of methods may be used to determine the proper angle and depth for a desired torque transfer level including experimental methods, as well as simulation methods such as finite element analysis (FEA). More accurate torque level limits may be designed into shaft assembly 10 since the direct winding of filament 16 into channels 28, 28' allows for a more precise and repeatable depth and angular disposition of filament 16 within channels 28, 28'.

Figure 5:
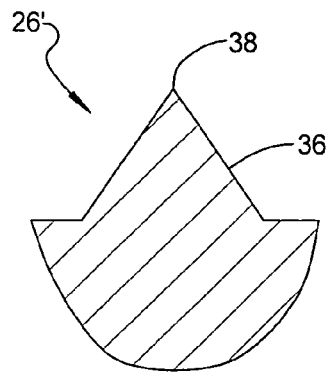
FIG. 5 is a fragmentary section view of an alternate lug design.
Figure 6:
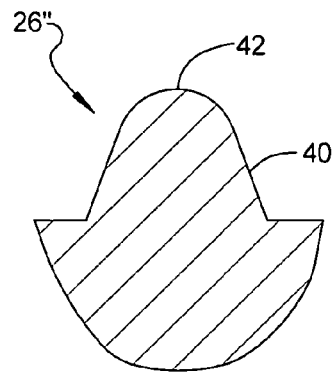
FIG. 6 is a fragmentary section view of an alternate lug design.
Figure 7:
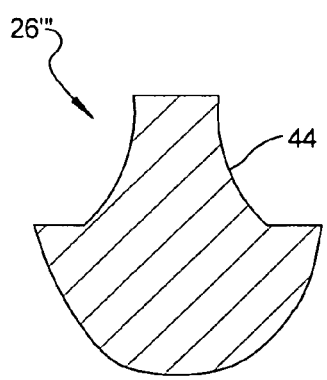
FIG. 7 is a fragmentary section view of an alternate lug design.
Figure 8:
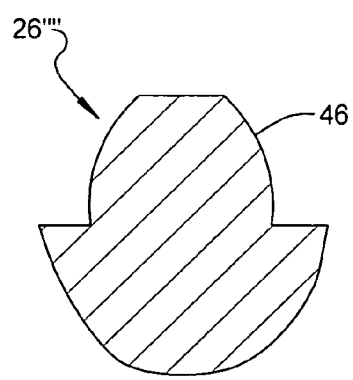
FIG. 8 is a fragmentary section view of an alternate lug design.

Lugs 26 may take a variety of forms. As seen in FIG. 4, lugs 26 may include ramped sidewalls 32 and a generally flat upper surface 34. Alternatively, as seen in FIG. 5, lugs 26' may include ramped sidewalls 36 meeting at a point 38. In another example, seen in FIG. 6, lugs 26" may include ramped sidewalls 40 and a curved upper surface 42. Alternately, as seen in FIGS. 7 and 8, lugs 26''', 26'''' may include concave or convex sidewalls 44, 46. Further yet, generally vertical sidewalls (not shown) may be employed. The various lug designs may assist the seating of various types of filament 16 within channels 28, 28'.

Due to the angular disposition of rows of lugs 26, filament 16 may be directly wound into channels 28, 28'. The winding of filament 16 into channels 28, 28' may eliminate the need for the drilling of holes into the coupling region for insertion of pins to couple shaft 12 to flange 14. The winding of filament 16 into channels 28, 28' may also eliminate the need to apply additional pressure to the filaments 16 disposed over the coupling region during curing, discussed below.

Coupling of shaft 12 to flange 14 may be achieved by winding filaments 16 into channels 28, 28' formed by lugs 26. Filaments 16 are able to extend into channels 28, 28' before a curing process has been performed due to the angular disposition of channels 28, 28'. More specifically, filaments 16 are able to extend into channels 28, 28' since channels 28, 28' may be disposed at an angle generally equal to the winding angle of filaments 16. After filaments 16 are wound about flange 14 within channels 28, 28', an overwrap layer 48 (seen in FIG. 4) of filament 16 may be wound around filament 16 at the coupling region. The overwrap layer 48 may be wrapped under tension causing filaments 16 to be compacted within channels 28, 28'.

After filament 16 is wound within channels 28, 28', shaft 12 may be cured, fixing shaft 12 and flange 14 together. During the curing process, any need for applying any additional radially inward pressure to compact filaments 16 in channels 28, 28' may be eliminated due to overwrap layer 48 causing filaments 16 to be seated within channels 28, 28' prior to curing.

Lugs 26 may be integrally formed on flange body portion 18, by a variety of processes including machining processes. The machining processes may include gear tooth forming or gear cutting methods.

What is claimed is:

1. A composite shaft assembly comprising:
a shaft body including a composite filament; and
a flange including an external surface having a plurality of lugs extending therefrom, each of said lugs being in the form of a pyramid including four sidewalls, a first and second of said plurality of lugs having an axial spacing therebetween and forming a first filament-receiving channel extending at an angle non-parallel to a longitudinal axis of said body, said first and second lugs each including a sidewall extending at said angle and defining said channel, said composite filament extending within and along said first filament-receiving channel.

2. The assembly of claim 1, wherein said plurality of lugs is helically disposed about said external surface forming a helically disposed filament-receiving channel therebetween.

3. The assembly of claim 1, wherein said plurality of lugs forms a second filament-receiving channel extending at an angle relative to the longitudinal axis and intersecting said first filament-receiving channel, said composite filament extending within and along said second filament-receiving channel.

4. The assembly of claim 1, wherein said angle is between approximately 0 degrees and approximately 90 degrees.

5. The assembly of claim 1, wherein said lugs form a plurality of filament-receiving channels extending about said external surface.

6. The assembly of claim 1, wherein said filament-receiving channels are configured to be geometrically compliant and generally parallel to a composite filament.

7. The assembly of claim 1, wherein said plurality of lugs is formed by at least one of a machining process or other material forming process.

8. The assembly of claim 1, wherein said composite filament extends within said first filament-receiving channel at said angle.

9. The assembly of claim 1, wherein said composite filament extends within and along an entire axial extent of said first filament-receiving channel.

10. The assembly of claim 1, wherein said sidewalls of said pyramid converge to a point.

11. A composite shaft assembly comprising:
a shaft body including a composite filament; and
a flange including an external surface having a plurality of lugs extending therefrom, each of said lugs being in the form of a pyramid including four sidewalls, a first and second of said plurality of lugs having an axial spacing therebetween and forming a first filament-receiving channel extending at an angle non-parallel to a longitudinal axis of said composite shaft assembly, said first and second lugs each including a sidewall extending at said angle and defining said channel, said filament extending between said first and second lugs at said angle.

12. The assembly of claim 11, wherein said filament extends between said first and second lugs when in an uncured state.

13. The assembly of claim 11, wherein said filament extends along a length of said filament-receiving channel.

14. The assembly of claim 13, wherein said filament extends along said filament receiving channel when in an uncured state.

15. The assembly of claim 11, wherein said plurality of lugs forms a second filament-receiving channel extending at an angle relative to the longitudinal axis and intersecting said first filament-receiving channel, said second filament-receiving channel housing said filament therein.

16. The assembly of claim 11, wherein said angle is between approximately 0 degrees and approximately 90 degrees.

17. The assembly of claim 11, wherein said plurality of lugs is helically disposed about said external surface forming a helically disposed filament-receiving channel therebetween.

18. The assembly of claim 17, wherein said plurality of lugs is formed by at least one of a machining process or other material forming process.

19. A method of coupling a composite shaft including a composite filament to a flange having a plurality of lugs each in the form of a pyramid including four sidewalls, forming an angularly disposed channel, said method comprising:
wrapping the uncured composite filament around the flange through the angularly disposed channel between sidewalls of the lugs defining the angularly disposed channel, said wrapping including the filament extending at an angle corresponding to the angularly disposed channel;
wrapping uncured composite filament over the uncured composite filament disposed in the channel; and
curing the composite filament after said wrapping.

20. The method of claim 19, wherein said coupling includes applying a radially inward force via the filament overwrap to the filament disposed in the channel during said curing such that the filament disposed in the channel stays in the channel during said curing.

* * * * *